(12) United States Patent
Gong

(10) Patent No.: US 11,863,846 B2
(45) Date of Patent: Jan. 2, 2024

(54) MULTIMEDIA DATA PUBLISHING METHOD AND APPARATUS, AND DEVICE AND MEDIUM

(71) Applicant: BEIJING BYTEDANCE NETWORK TECHNOLOGY CO., LTD., Beijing (CN)

(72) Inventor: Qihui Gong, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/818,690

(22) Filed: Aug. 9, 2022

(65) Prior Publication Data

US 2022/0385994 A1    Dec. 1, 2022

Related U.S. Application Data

(63) Continuation of application No. PCT/CN2021/114212, filed on Aug. 24, 2021.

(30) Foreign Application Priority Data

Sep. 18, 2020    (CN) .......................... 202010986236.2

(51) Int. Cl.
*H04N 21/8352* (2011.01)
*H04N 21/8358* (2011.01)
*H04N 21/84* (2011.01)

(52) U.S. Cl.
CPC ..... *H04N 21/8352* (2013.01); *H04N 21/8358* (2013.01); *H04N 21/84* (2013.01)

(58) Field of Classification Search
CPC ........... H04N 21/8352; H04N 21/8358; H04N 21/84; H04N 21/234309; H04N 21/23892;

(Continued)

(56) References Cited

U.S. PATENT DOCUMENTS 9,058,645 B1 *   6/2015   Corley ............... H04N 21/8358
10,735,825 B1 *  8/2020   Comito .................. H04N 5/783
(Continued)

FOREIGN PATENT DOCUMENTS

CN    101945093 A    1/2011
CN    102790725 A    11/2012
(Continued)

OTHER PUBLICATIONS

First Office Action in CN Application No. 2020109862362, English translation (39 pages).

(Continued)

*Primary Examiner* — Fernando Alcon

(57) ABSTRACT

A method and apparatus for publishing multimedia data, and a device and a medium are provided. The method includes: acquiring multimedia data to be published; in response to acquiring a multimedia synchronous publishing request, sending the multimedia synchronous publishing request to a second multimedia platform indicated by the multimedia synchronous publishing request, such that the second multimedia platform publishes synchronous multimedia data that is generated on the basis of the multimedia data to be published, wherein the synchronous multimedia data includes identification information of a first multimedia platform. Thus, a user can synchronously publish multimedia data at another multimedia platform by means of an original multimedia platform, and add an identifier of the original multimedia platform to the multimedia data that is published at the other multimedia platform, so as to enable a user at the other multimedia platform to be aware of the original multimedia platform.

24 Claims, 3 Drawing Sheets

(58) Field of Classification Search
CPC ............. H04N 21/2393; H04N 21/242; H04N 21/25875; H04N 21/2743; H04N 21/4307; H04N 21/274; G06Q 50/01
See application file for complete search history.

(56) References Cited

U.S. PATENT DOCUMENTS

| | | | |
|---|---|---|---|
| 11,050,691 B1* | 6/2021 | DePue | .................... G06F 21/41 |
| 2002/0112247 A1 | 8/2002 | Horner et al. | |
| 2008/0140433 A1 | 6/2008 | Levy et al. | |
| 2011/0093900 A1* | 4/2011 | Patel | .................. H04N 21/2343 725/120 |
| 2013/0091214 A1 | 4/2013 | Kellerman et al. | |
| 2013/0091582 A1* | 4/2013 | Chen | ....................... H04L 63/10 726/26 |
| 2013/0179761 A1* | 7/2013 | Cho | ..................... G06F 40/186 715/202 |
| 2013/0254797 A1* | 9/2013 | Reisner | ................ H04N 21/812 705/14.66 |
| 2013/0268962 A1* | 10/2013 | Snider | ................ H04N 21/6543 725/32 |
| 2013/0308817 A1* | 11/2013 | Konkel | .................. G06Q 50/01 382/100 |
| 2014/0279038 A1* | 9/2014 | Lombard | ............... G06Q 50/01 705/14.66 |
| 2015/0040174 A1 | 2/2015 | Mazzara et al. | |
| 2015/0195095 A1* | 7/2015 | Gillead | ................. H04L 63/083 715/753 |
| 2015/0331583 A1* | 11/2015 | Zhang | .................. G06F 3/0484 715/825 |
| 2015/0347996 A1 | 12/2015 | Alsina et al. | |
| 2016/0080807 A1* | 3/2016 | Trimper | ........... H04N 21/47202 725/38 |
| 2016/0189316 A1* | 6/2016 | Lenahan | ................ G06Q 50/01 705/26.41 |
| 2016/0255379 A1* | 9/2016 | Langan | .............. H04N 21/4825 725/88 |
| 2016/0269483 A1 | 9/2016 | Ran et al. | |
| 2017/0006301 A1* | 1/2017 | Cain | ....................... H04N 19/61 |
| 2017/0017618 A1* | 1/2017 | Dunn | ..................... G06F 40/186 |
| 2018/0307566 A1* | 10/2018 | Dowlatkhah | ........... G06F 16/27 |
| 2019/0045246 A1* | 2/2019 | Ghangam | ............. H04L 7/0012 |
| 2019/0235848 A1 | 8/2019 | Swiecki et al. | |
| 2020/0068262 A1* | 2/2020 | Saldana | ............. H04N 21/8173 |
| 2021/0241387 A1* | 8/2021 | Dorie | ..................... G06Q 50/01 |
| 2021/0328962 A1* | 10/2021 | Bou-Abboud | ..... G06Q 10/1095 |
| 2022/0094758 A1 | 3/2022 | Song | |
| 2022/0182699 A1* | 6/2022 | Gordon | ............ H04N 21/64322 |
| 2022/0263786 A1* | 8/2022 | Brown | .................... G06F 21/31 |

FOREIGN PATENT DOCUMENTS

| | | | | |
|---|---|---|---|---|
| CN | 103051646 A | 4/2013 | | |
| CN | 103095660 A | 5/2013 | | |
| CN | 103179021 A | 6/2013 | | |
| CN | 103546426 A | 1/2014 | | |
| CN | 104660635 A | 5/2015 | | |
| CN | 105933309 A | 9/2016 | | |
| CN | 107483460 A | 12/2017 | | |
| CN | 109685600 A | 4/2019 | | |
| CN | 109769127 A | 5/2019 | | |
| CN | 109858967 A | 6/2019 | | |
| CN | 110083382 A | 8/2019 | | |
| CN | 112073753 A | 12/2020 | | |
| WO | WO-2016081853 A1 * | 5/2016 | ........... H04L 63/083 |

OTHER PUBLICATIONS

Peng, Z., "The logo of the screen needs to be standardized when broadcasting the program," Chinese Journal of Radio and Television, Dec. 31, 2018, English translation (2 pages).
Search Report dated Nov. 21, 2021 in PCT/CN2021/114212, English translation (13 pages).
Extended European Search Report dated Jun. 30, 2023 in European Application No. 21868403.3 (8 pages).

\* cited by examiner

MULTIMEDIA DATA PUBLISHING METHOD AND APPARATUS, AND DEVICE AND MEDIUM

CROSS REFERENCE TO RELATED APPLICATION

The present application is a continuation of International Application No. PCT/CN2021/114212, filed on Aug. 24, 2021 which claims priority to Chinese Patent Application No. 202010986236.2, titled "MULTIMEDIA DATA PUBLISHING METHOD AND APPARATUS, AND DEVICE AND MEDIUM", filed on Sep. 18, 2020 with China National Intellectual Property Administration, both of which are incorporated herein by reference in their entireties.

TECHNICAL FIELD

The present disclosure relates to the technical field of data processing, and in particular, to a method and apparatus for publishing multimedia data, a device and a medium.

BACKGROUND

With the continuous development of intelligent terminals and multimedia data processing technologies, a user may have various experiences, such as interaction and share, in the form of multimedia through a multimedia platform on a terminal device.

One user may usually register on multiple multimedia platforms. When publishing multimedia content on one multimedia platform, the user has a demand to publish the same multimedia content on another multimedia platform. At present, a display effect of the multimedia content published on the other multimedia platform is limited and cannot meet the demand.

SUMMARY

In order to solve or at least partially solve the above technical problems, a method and apparatus for publishing multimedia data, a device and a medium are provided according to the present disclosure.

A method for publishing multimedia data is provided according to an embodiment of the disclosure. The method is applied to a first multimedia platform. The method includes:

acquiring to-be-published multimedia data; and sending, in response to an acquirement of a multimedia synchronous publishing request, the multimedia synchronous publishing request to a second multimedia platform indicated by the multimedia synchronous publishing request, where the multimedia synchronous publishing request is used to request the second multimedia platform to publish synchronous multimedia data generated based on the to-be-published multimedia data, where the synchronous multimedia data includes identification information of the first multimedia platform.

A method for publishing multimedia data is provided according to an embodiment of the disclosure. The method is applied to a second multimedia platform. The method includes:

receiving a multimedia synchronous publishing request from a first multimedia platform, where the multimedia synchronous publishing request includes to-be-published multimedia data or synchronous multimedia data generated based on the to-be-published multimedia data; and publishing the synchronous multimedia data, where the synchronous multimedia data includes identification information of the first multimedia platform.

An apparatus for publishing multimedia data is provided according to an embodiment of the disclosure. The apparatus is arranged in a first multimedia platform. The apparatus includes: a multimedia acquiring module and a multimedia synchronous publishing module.

The multimedia acquiring module is configured to acquire to-be-published multimedia data.

The multimedia synchronous publishing module configured to send, in response to an acquirement of a multimedia synchronous publishing request, the multimedia synchronous publishing request to a second multimedia platform indicated by the multimedia synchronous publishing request, where the multimedia synchronous publishing request is used to request the second multimedia platform to publish synchronous multimedia data generated based on the to-be-published multimedia data, where the synchronous multimedia data includes identification information of the first multimedia platform.

An apparatus for publishing multimedia data is provided according to an embodiment of the disclosure. The apparatus is arranged in a second multimedia platform. The apparatus includes: a request receiving module and a multimedia publishing module.

The request receiving module is configured to receive a multimedia synchronous publishing request from a first multimedia platform, where the multimedia synchronous publishing request includes to-be-published multimedia data or synchronous multimedia data generated based on the to-be-published multimedia data.

The multimedia publishing module is configured to publish the synchronous multimedia data, where the synchronous multimedia data includes identification information of the first multimedia platform.

An electronic device is provided according to an embodiment of the disclosure. The electronic device includes a processor; and a memory for storing executable instructions. The processor is configured to read the executable instructions from the memory, and execute the instructions to implement the method for publishing the multimedia data according to the embodiments of the disclosure.

A computer-readable storage medium is provided according to an embodiment of the disclosure. The storage medium stores a computer program. The computer program is used to implement the method for publishing the multimedia data according to the embodiments of the disclosure.

Compared with the conventional technology, the technical solutions provided by the embodiments of the present disclosure have the following advantages. In the solutions for publishing the multimedia data according to the embodiments of the present disclosure, the first multimedia platform acquires the to-be-published multimedia data; sends, in response to an acquirement of the multimedia synchronous publishing request, the multimedia synchronous publishing request to the second multimedia platform indicated by the multimedia synchronous publishing request. The second multimedia platform publishes the synchronous multimedia data generated based on the to-be-published multimedia data. The synchronous multimedia data includes the identification information of the first multimedia platform. By adopting the above technical solution, the user can publish multimedia data synchronously on another multimedia platform through an original multimedia platform, and an identifier of the original multimedia platform is added to the multimedia data published by the other multimedia platform. In this way, the user of the other multimedia platform can perceive the original multimedia platform, thereby enhancing the ownership of the original multimedia platform to the multimedia data and improving platform cognition for the original multimedia platform.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first", "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
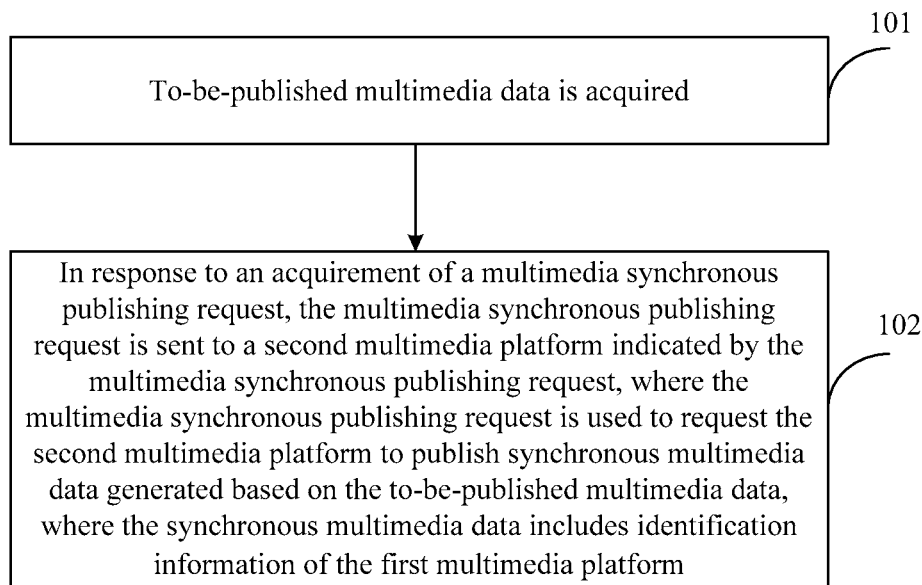
FIG. 1 is a schematic flowchart of a method for publishing multimedia data according to an embodiment of the present disclosure.

FIG. 1 is a schematic flowchart of a method for publishing multimedia data according to an embodiment of the present disclosure. The method may be executed by an apparatus for publishing multimedia data. The apparatus may be implemented by software and/or hardware, and may generally be integrated in an electronic device. As shown in FIG. 1, the method is applied to a first multimedia platform, and may specifically include steps 101 to 102.

In Step 101, to-be-published multimedia data is acquired.

The to-be-published multimedia data may be multimedia data which wants to be published by a user of the first multimedia platform, and the multimedia data may be currently recorded by the user, or may be locally stored, which is not specifically limited. Moreover, a specific type of the multimedia data is not limited in the embodiment of the present disclosure. For example, the multimedia data may include one or more of video data, audio data, image data, and article data. The first multimedia platform may be a multimedia platform corresponding to a multimedia client currently used by the user. The user desires to publish the multimedia data on the first multimedia platform.

In an embodiment of the present disclosure, the first multimedia platform acquires the to-be-published multimedia data through a corresponding multimedia client. The multimedia client refers to a user-oriented application program of the first multimedia platform installed on a terminal device. Optionally, when the user needs to publish multimedia data, the multimedia client may display a multimedia publishing page to the user in response to the user triggering a set button, and receive the multimedia data uploaded by the user through the multimedia publishing page. A variety of functional components may be set in the multimedia publishing page, such that the user can complete editing operations related to multimedia publishing. For example, the multimedia publishing page may include a functional component for uploading multimedia data.

Optionally, after uploading the to-be-published multimedia data on the multimedia publishing page, the user may edit the multimedia data. For example, edition on the multimedia data may include at least one of setting a title, making a cover, and writing an introduction for the to-be-published multimedia data or the like.

In Step 102, in response to an acquirement of a multimedia synchronous publishing request, the multimedia synchronous publishing request is sent to a second multimedia platform indicated by the multimedia synchronous publishing request, where the multimedia synchronous publishing request is used to request the second multimedia platform to publish synchronous multimedia data generated based on the to-be-published multimedia data, where the synchronous multimedia data includes identification information of the first multimedia platform.

The second multimedia platform refers to a multimedia platform on which the to-be-published multimedia data is to be published simultaneously, which is different from the above-mentioned first multimedia platform. The first multimedia platform may acquire the multimedia synchronous publishing request. The multimedia synchronous publishing request refers to an instruction that the user wants to publish multimedia data on different multimedia platforms. The specific multimedia platforms may include the current first multimedia platform and at least one second multimedia platform. The number of the second multimedia platform may be at least one, which will not be specifically limited.

In an embodiment of the present disclosure, the first multimedia platform may acquire the multimedia synchronous publishing request through a corresponding multimedia client. In an embodiment, the user may submit the multimedia synchronous publishing request to the multimedia client through the above-mentioned multimedia publishing page. The multimedia client receives the multimedia synchronous publishing request, and sends the multimedia synchronous publishing request to the first multimedia platform. The first multimedia platform may determine that the user wants to publish the current to-be-published multimedia data on multiple multimedia platforms, when receiving the multimedia synchronous publishing request.

In an embodiment, the multimedia synchronous publishing request may include a multimedia synchronous publishing identifier. The first multimedia platform may send the multimedia synchronous publishing request to a second multimedia platform corresponding to the multimedia synchronous publishing identifier, in response to the acquirement of the multimedia synchronous publishing request. The multimedia synchronous publishing identifier is used to identify the second multimedia platform on which the to-be-published multimedia data is to be published simultaneously. Each second multimedia platform corresponds to a unique multimedia synchronous publishing identifier. The second multimedia platform on which the user currently needs to publish the multimedia data simultaneously may be determined based on the multimedia synchronous publishing identifier.

In an embodiment of the present disclosure, the synchronous multimedia data refers to data published by processing the to-be-published multimedia data of the first multimedia platform. The synchronous multimedia data may include the identification information of the first multimedia platform. The synchronous multimedia data may be obtained by adding the identification information of the first multimedia platform to the to-be-published multimedia data.

In an embodiment of the present disclosure, in response to the multimedia synchronous publishing request, the first multimedia platform may add the identification information of the first multimedia platform to the to-be-published multimedia data, to generate the synchronous multimedia data, add the synchronous multimedia data to the multimedia synchronous publishing request, and send the multimedia synchronous publishing request to the second multimedia platform. The second multimedia platform directly publishes the synchronous multimedia data after receiving the multimedia synchronous publishing request.

Alternatively, in response to the multimedia synchronous publishing request, the first multimedia platform may add the to-be-published multimedia data to the multimedia synchronous publishing request and send the multimedia synchronous publishing request to the second multimedia platform. The second multimedia platform receives the multimedia synchronous publishing request, adds the identification information of the first multimedia platform to the to-be-published multimedia data to obtain the synchronous multimedia data, and publishes the synchronous multimedia data.

That is, in the embodiments of the present disclosure, the synchronous multimedia data may be generated by the first multimedia platform or the second multimedia platform, which is not specifically limited.

The identification information of the first multimedia platform is used to characterize the first multimedia platform. The specific form of the identification information is not limited in the embodiments of the present disclosure. For example, the identification information may be represented by an identification watermark, and the identification watermark may be a pattern or character or the like added to the multimedia data in a watermark technology. The added identification watermark does not affect the display of the multimedia data. When the synchronous multimedia data including the identification information of the first multimedia platform is consumed by a user of the second multimedia platform, the user's cognition for the first multimedia platform can be improved, and the content ownership of the first multimedia platform can be protected.

In an embodiment of the present disclosure, after acquiring the multimedia synchronous publishing request, the first multimedia platform may publish the multimedia data. After obtaining the multimedia synchronous publishing request triggered by the user, the first multimedia platform may publish the multimedia data, and send the multimedia synchronous publishing request to the second multimedia platform. The second multimedia platform publishes the synchronous multimedia data including the identification information of the first multimedia platform. In this way, the multimedia data may be published on different platforms without affecting the publishing of the multimedia data on the first multimedia platform. Therefore, original ownership of the multimedia data may be enhanced.

In the solutions for publishing multimedia data according to the embodiments of the present disclosure, the first multimedia platform acquires the to-be-published multimedia data; sends, in response to an acquirement of the multimedia synchronous publishing request, the multimedia synchronous publishing request to the second multimedia platform indicated by the multimedia synchronous publishing request. The second multimedia platform publishes the synchronous multimedia data generated based on the to-be-published multimedia data. The synchronous multimedia data includes the identification information of the first multimedia platform. By adopting the above technical solution, the user can publish multimedia data synchronously on another multimedia platform through an original multimedia platform, and an identifier of the original multimedia platform is added to the multimedia data published by the other multimedia platform. In this way, the user of the other multimedia platform can perceive the original multimedia platform, thereby enhancing the ownership of the original multimedia platform to the multimedia data and improving platform cognition for the original multimedia platform. In addition, for multimedia creators, multimedia data can be published on different multimedia platforms only by sending a multimedia publishing request once, which simplifies the process of synchronously publishing the multimedia data, and helps the user to efficiently and conveniently publish the multimedia data on different platforms. Thus, the operating experience of the multimedia creators is improved and the actual scene requirement is met.

In some embodiments, the method for publishing multimedia data may further include: adding identification information of the second multimedia platform to the to-be-published multimedia data, and generating the synchronous multimedia data; and sending the synchronous multimedia data to the second multimedia platform. The identification information of the second multimedia platform is used to characterize the second multimedia platform. That is, the synchronous multimedia data may include the identification information of the second multimedia platform in addition to the identification information of the first multimedia platform. After determining the second multimedia platform, the first multimedia platform may add the identification information of the second multimedia platform to the to-be-published multimedia data, to obtain the synchronous multimedia data. The second multimedia platform publishes the synchronous multimedia data.

When the synchronous multimedia data including the identification information of the second multimedia platform is consumed by the user of the second multimedia platform, the user's cognition for the second multimedia platform can be enhanced. In the embodiment of the present disclosure, the user's cognition for both the first multimedia platform and the second multimedia platform can be enhanced, and the content ownership of both two multimedia platforms can be protected.

In some embodiments, the method for publishing the multimedia data may further include: generating the identification information of the first multimedia platform based on a first identification parameter of the first multimedia platform. In an embodiment, the method for publishing the multimedia data may further include: sending the first identification parameter to the second multimedia platform. The second multimedia platform adds the identification information of the first multimedia platform to the to-be-published multimedia data based on the first identification parameter.

The first identification parameter is a related parameter for generating the identification information of the first multimedia platform. For example, if the identification information is an identification watermark, the first identification parameter may be a first watermark parameter. The first multimedia platform may pre-store the first identification parameter locally, and may generate corresponding identification information based on the first identification parameter, so as to add the identification information of the first multimedia platform to the to-be-published multimedia data, to generate the synchronous multimedia data. Alternatively, the first multimedia platform may send the first identification parameter to the second multimedia platform. The second multimedia platform generates the identification information of the first multimedia platform based on the first identification parameter and adds the identification information of the first multimedia platform to the to-be-published multimedia data, to generate the synchronous multimedia data.

In some embodiments, the method for publishing the multimedia data may further include: determining a second identification parameter of the second multimedia platform based on a pre-stored correspondence between the second multimedia platform and the second identification parameter, and generating identification information of the second multimedia platform based on the second identification parameter. In an embodiment, the method for publishing the multimedia data may further include: sending the second identification parameter to the second multimedia platform. The second multimedia platform adds the identification information of the second multimedia platform to the to-be-published multimedia data based on the second identification parameter.

The second identification parameter is a related parameter for generating the identification information of the second multimedia platform. For example, if the identification information is an identification watermark, the second identification parameter may be a second watermark parameter. The synchronous multimedia data may include the identification information of the second multimedia platform. Therefore, the first multimedia platform may pre-store a correspondence between the multimedia platform and the identification parameter. The first multimedia platform may acquire the second identification parameter corresponding to the second multimedia platform in response to a determination of the second multimedia platform, and generate the identification information of the second multimedia platform based on the second identification parameter, so as to add the identification information of the second multimedia platform to the to-be-published multimedia data to generate the synchronous multimedia data. Alternatively, the first multimedia platform may send the second identification parameter to the second multimedia platform. The second multimedia platform generates the identification information of the second multimedia platform based on the second identification parameter; and adds the identification information of the second multimedia platform to the to-be-published multimedia data, to generate the synchronous multimedia data.

The first multimedia platform presets the identification parameter; or sends the preset identification parameter to the second multimedia platform, so that the second multimedia platform adds the identification information of the first multimedia platform and/or the second multimedia platform to the to-be-published multimedia data based on the identification parameter, thereby more accurately controlling the display effect of the multimedia data published by the second multimedia platform synchronously, which is beneficial to enhance the cognition for the first multimedia platform and the second multimedia platform.

In some embodiments, the identification information includes an identification watermark. Optionally, an identification parameter corresponding to the identification information includes watermark content information and watermark style information. Optionally, the watermark content information includes multimedia platform information, and the watermark style information includes at least one of watermark size information, watermark position information and watermark shape information.

The embodiment of the present disclosure is described by taking the identification information including the identification watermark as an example. The watermark content information includes multimedia platform information. The multimedia platform information may be, for example, a pattern or character that can characterize the multimedia platform. For example, the multimedia platform information may include a platform name, a platform type and/or a platform icon or the like of the multimedia platform. The information of the multimedia platform may be represented in the form of text, static image and/or dynamic image, etc., which is not limited. The watermark style information may include a variety of parameter information that can characterize different styles of the watermark. The above watermark size information, the watermark position information and the watermark shape information are only examples. The watermark size information indicates a size of the watermark, and the watermark position information indicates a position of the watermark in the multimedia data. For example, the watermark may be displayed in an upper left corner, a lower left corner, an upper right corner or a lower right corner of the multimedia data. The watermark shape information indicates an overall shape of the watermark, such as a square, a circle.

Optionally, the watermark content information may also include the user's identification information, such as the user's account name or the user's avatar. In this way, the identification watermark of the first multimedia platform in the synchronous multimedia data may also include relevant information of the multimedia creator, which can improve the cognition for the multimedia creator, and enhance the cognition for the binding relationship between the multimedia creator and the first multimedia platform.

In some embodiments, the method for publishing the multimedia data may further include: acquiring a first user identifier of a user, and acquiring a second user identifier bound with the first user identifier, based on the first user identifier; and sending the second user identifier to the second multimedia platform. Alternatively, the method may further include: acquiring a first user identifier of a user, sending the first user identifier to the second multimedia platform. The second multimedia platform acquires a second user identifier bound with the first user identifier, based on the first user identifier. The second user identifier is an identifier of the user on the second multimedia platform. In some embodiments, in response to the acquirement of the multimedia synchronous publishing request, the method for publishing the multimedia data further includes: publishing the multimedia data under the first user identifier.

The first user identifier is a registration identifier of a user on the first multimedia platform. The same user may be registered on multiple multimedia platforms. The first user identifier and the second user identifier represent registration identifiers of the current user on the first multimedia platform and the second multimedia platform, respectively. The same user is registered on both the first multimedia platform and the second multimedia platform. Therefore, the user may establish a binding relationship between the first user identifier and the second user identifier for subsequent synchronous publishing of multimedia data. Both the first multimedia platform and the second multimedia platform may store the binding relationship between the first user identifier and the second user identifier.

The first multimedia platform may acquire the first user identifier of the user through a corresponding multimedia client, and then publish the multimedia data under the first user identifier. Thus, the other users can browse the multimedia data under the first user identifier. The first multimedia platform obtains the first user identifier of the user on the first multimedia platform; determines a second user identifier bound with the first user identifier, based on the first user identifier and a pre-stored binding relationship between the first user identifier and the second user identifier; and sends the second user identifier to the second multimedia platform. The second multimedia platform can publish the synchronous multimedia data under the second user identifier. Alternatively, the first multimedia platform acquires the first user identifier of the user and sends the first user identifier to the second multimedia platform. The second multimedia platform determines a second user identifier bound with the first user identifier, based on the first user identifier and a pre-stored binding relationship between the first user identifier and the second user identifier; and publishes the synchronous multimedia data under the second user identifier. Optionally, when the above-mentioned binding relationship does not exist in the first multimedia platform or the second multimedia platform, the user may be notified to establish the binding relationship in real time. The multimedia data is published under the accounts of the same user on different multimedia platforms by the above-mentioned binding of the user identifiers on different platforms, which is beneficial to protect the copyright of the user.

In some embodiments, before publishing the multimedia data under the first user identifier, the method for publishing the multimedia data may further include: transcoding the to-be-published multimedia data based on a first preset transcoding rule, where the first preset transcoding rule includes at least one of special effect processing, format conversion and data compression. In a multimedia platform, many pieces of to-be-published multimedia data comes from different users, and parameters such as the format, capacity or special effect of the multimedia data may not meet the publishing requirements of the multimedia platform and the consumption requirements in various scenarios. Therefore, before publishing the multimedia data, the first multimedia platform may transcode the to-be-published multimedia data. The specific preset transcoding rule is not limited in the embodiment of the present disclosure. For example, the preset transcoding rule may include special effect processing, format conversion and/or data compression or the like, to meet publishing requirements. The above-mentioned first multimedia platform transcoding the multimedia data is beneficial to meet different requirements of subsequent multimedia data display, thereby obtaining good display effect of the multimedia data.

Figure 2:
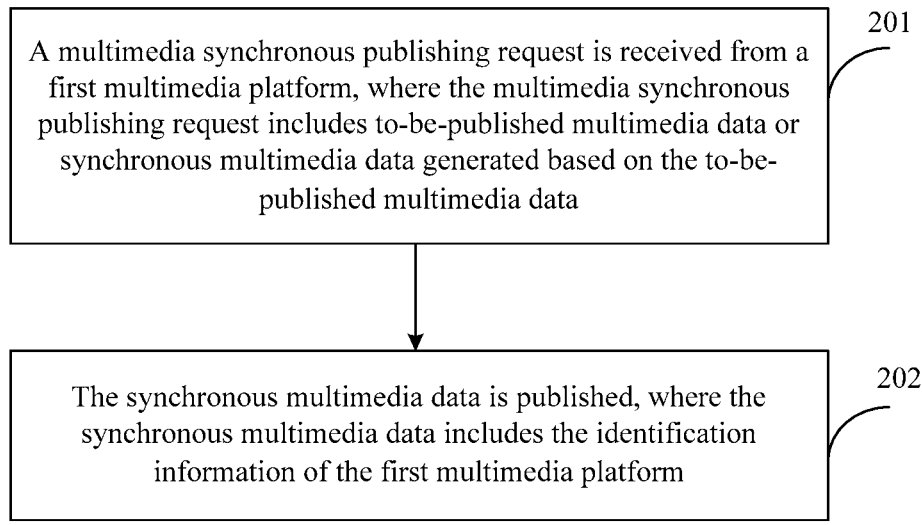
FIG. 2 is a schematic flowchart of a method for publishing multimedia data according to another embodiment of the present disclosure.

FIG. 2 is a schematic flowchart of a method for publishing multimedia data according to an embodiment of the present disclosure. The method may be executed by an apparatus for publishing multimedia data. The apparatus may be implemented by software and/or hardware, and may generally be integrated in an electronic device. As shown in FIG. 2, the method is applied to a second multimedia platform, and may specifically include steps 201 to 202.

In Step 201, a multimedia synchronous publishing request is received from a first multimedia platform, where the multimedia synchronous publishing request includes to-be-published multimedia data or synchronous multimedia data generated based on the to-be-published multimedia data.

The second multimedia platform refers to a multimedia platform on which the to-be-published multimedia data is to be published simultaneously, which is different from the above-mentioned first multimedia platform. The second multimedia platform may receive the multimedia synchronous publishing request from the first multimedia platform, and perform subsequent processing in response to the multimedia synchronous publishing request.

In an embodiment, the multimedia synchronous publishing request includes the to-be-published multimedia data, and the method for publishing the multimedia data further includes: identifying the first multimedia platform; and adding the identification information of the first multimedia platform to the to-be-published multimedia data, and generating the synchronous multimedia data. The second multimedia platform acquires the multimedia synchronous publishing request. If the multimedia synchronous publishing request only includes the to-be-published multimedia data, the identification information of the first multimedia platform may be added to the to-be-published multimedia data, to generate the synchronous multimedia data.

In an embodiment, the multimedia data includes video data, the adding the identification information of the first multimedia platform to the to-be-published multimedia data to generate the synchronous multimedia data includes: adding the identification information of the first multimedia platform to a first video frame set obtained by decoding the to-be-published multimedia data, to obtain a second video frame set; and encoding the second video frame set to generate the synchronous multimedia data. Optionally, the adding the identification information of the first multimedia platform to a first video frame set obtained by decoding the to-be-published multimedia data to obtain a second video frame set includes: adding the identification information of the first multimedia platform to a target video frame in the first video frame set, to obtain the second video frame set, where the target video frame is at least one video frame in the first video frame set.

In an embodiment of the present disclosure, the multimedia data being video data is taken as an example. The second multimedia platform may decode the to-be-published multimedia data to obtain a first video frame set, add the identification information of the first multimedia platform to the first video frame set, to obtain a second video frame set. The second multimedia platform encodes the second video frame set to generate the synchronous multimedia data. The target video frame refers to a video frame to which the identification information of the first multimedia platform needs to be added. The target video frame may be any one or more video frames in the first video frame set, which is determined according to the actual situation. A specific addition position of the identification information of the first multimedia platform in the to-be-published multimedia data will not be limited in the embodiment of the present disclosure, which is preferably at the beginning, middle and/or end of the multimedia data.

In an embodiment, when the multimedia data is video data, a new video frame may be added to the above-mentioned first video frame set, and the new video frame is used as the target video frame to which the identification information of the first multimedia frame is added.

In Step 202, the synchronous multimedia data is published, where the synchronous multimedia data includes the identification information of the first multimedia platform.

Specifically, the second multimedia platform receives the multimedia synchronous publishing request from the first multimedia platform. If the multimedia synchronous publishing request includes the synchronous multimedia data generated based on the to-be-published multimedia data, the second multimedia platform may directly perform the multimedia publishing process. In the multimedia publishing process, the second multimedia platform transcodes the synchronous multimedia data, to meet the publishing requirements; and publishes the synchronous multimedia data. If the multimedia synchronous publishing request includes the to-be-published multimedia data, the identification information of the first multimedia platform may be added to the to-be-published multimedia data during the transcoding process, to generate the synchronous multimedia data, and then the synchronous multimedia data is published.

In the solution for publishing multimedia data provided by the embodiment of the present disclosure, the second multimedia platform receives the multimedia synchronous publishing request from the first multimedia platform, and publishes the synchronous multimedia data. The multimedia synchronous publishing request includes the to-be-published multimedia data or the synchronous multimedia data generated based on the to-be-published multimedia data. The synchronous multimedia data includes the identification information of the first multimedia platform. By adopting the above technical solution, a multimedia platform publishes, in response to the multimedia synchronous publishing request from the original multimedia platform, the multimedia data added with the identification information of the original multimedia platform, so that the users of the current platform can perceive the original multimedia platform, thereby enhancing the ownership of the original multimedia platform to multimedia data and improving the platform cognition for the original multimedia platform.

In some embodiments, the method for publishing the multimedia data may further include: acquiring a first identification parameter from the first multimedia platform or acquiring a first identification parameter of the first multimedia platform which is stored locally. Optionally, the method for publishing the multimedia data may further include: generating the identification information of the first multimedia platform based on the first identification parameter; and adding the identification information of the first multimedia platform to the to-be-published multimedia data, to generate the synchronous multimedia data.

The second multimedia platform may acquire an identification parameter from the first multimedia platform. Alternatively, the second multimedia platform may store identification parameters corresponding to different multimedia platforms locally in advance. After receiving the multimedia synchronous publishing request from the first multimedia platform, the second multimedia platform may identify the first multimedia platform, and search for a corresponding first identification parameter based on the pre-stored correspondence between the multimedia platforms and the identification parameters. Optionally, the identification information may be an identification watermark. An identification parameter may include watermark content information and watermark style information. Optionally, the watermark content information includes multimedia platform information, and the watermark style information includes at least one of watermark size information, watermark position information and watermark shape information. After acquiring the first identification parameter, the second multimedia platform may generate a corresponding identification watermark of the first multimedia platform based on the watermark content information and the watermark style information in the first identification parameter; and add the identification watermark of the first multimedia platform to the to-be-published multimedia data, to generate the synchronous multimedia data.

The above-mentioned first identification parameter of the identification information of the first multimedia platform added by the second multimedia platform in the to-be-published multimedia data may be obtained from the first multimedia platform, or may be preset by the second multimedia platform. Therefore, it is ensured that the watermark may be added successfully, thereby generating the identification watermark of the first multimedia platform diversely.

In some embodiments, before publishing the synchronous multimedia data, the method for publishing the multimedia data may further include: adding identification information of the second multimedia platform to the to-be-published multimedia data. In some embodiments, the method for publishing the multimedia data may further include: acquiring a second identification parameter of the second multimedia platform from the first multimedia platform or acquiring a second identification parameter which is stored locally; and generating the identification information of the second multimedia platform based on the second identification parameter. The identification information of the second multimedia platform is used to characterize the second multimedia platform. The second identification parameter is a related parameter for controlling the identification information of the second multimedia platform. For example, when the identification information is an identification watermark, the second identification parameter may be a second watermark parameter. The synchronous multimedia data may include the identification information of the second multimedia platform, therefore the second multimedia platform may acquire the local second identification parameter, and generate the identification information of the second multimedia platform based on the second identification parameter, so as to add the identification information of the second multimedia platform to the to-be-published multimedia data to generate the synchronous multimedia data. Alternatively, the second multimedia platform may acquire the second identification parameter from the first multimedia platform, generate the identification information of the second multimedia platform based on the second identification parameter, and add the identification information of the second multimedia platform to the to-be-published multimedia data, to generate the synchronous multimedia data.

When the synchronous multimedia data including the identification information of the second multimedia platform is consumed by a user of the second multimedia platform, the user's cognition for the second multimedia platform can be enhanced. In the embodiment of the present disclosure, the second multimedia platform may add the identification information of the second multimedia platform and the identification information of the first multimedia platform to the to-be-published multimedia data, therefore the user's cognition for both the first multimedia platform and the second multimedia platform can be enhanced, and the content ownership of both the two multimedia platforms can be protected.

In some embodiments, the method for publishing the multimedia data may further include: acquiring a second user identifier which is sent by the first multimedia platform and acquired based on a first user identifier of a user; or acquiring a first user identifier of a user sent by the first multimedia platform and acquiring a second user identifier bound with the first user identifier, based on the first user identifier. The second user identifier is an identifier of the user on the second multimedia platform. Optionally, publishing the synchronous multimedia data may include publishing the synchronous multimedia data under the second user identifier.

The first user identifier is a registration identifier of the user on the first multimedia platform. The same user may be registered on multiple multimedia platforms. The first user identifier and the second user identifier represent registration identifiers of the current user on the first multimedia platform and the second multimedia platform respectively. The same user is registered on both the first multimedia platform and the second multimedia platform. Therefore, the user may establish a binding relationship between the first user identifier and the second user identifier for subsequent synchronous publishing of multimedia data. Both the first multimedia platform and the second multimedia platform may store the binding relationship between the first user identifier and the second user identifier.

The second multimedia platform may directly acquire the second user identifier of the current user from the first multimedia platform. Alternatively, the second multimedia platform may acquire the first user identifier from the first multimedia platform, and determine a second user identifier bound with the first user identifier, based on the first user identifier and a pre-stored binding relationship between the first user identifier and the second user identifier, and then publish the multimedia data added with the identification watermark of the first multimedia platform, under the second user identifier. The multimedia data is published under the accounts of the same user on different multimedia platforms by the above-mentioned binding of the user identifiers on different platforms, which is beneficial to protect the copyright of the user.

In some embodiments, before publishing the synchronous multimedia data, the method for publishing the multimedia data may further include: transcoding the synchronous multimedia data based on a second preset transcoding rule. The second preset transcoding rule is a transcoding rule corresponding to the second multimedia platform, which is different from a first transcoding rule corresponding to the first multimedia platform. Before publishing the synchronous multimedia data, a transcoding processing may be uniformly performed on the synchronous multimedia data with the second preset transcoding rule. The specific preset transcoding rule is not limited in the embodiment of the present disclosure. For example, the preset transcoding rule may include special effect processing, format conversion and/or data compression or the like, to meet publishing requirements. The above-mentioned second multimedia platform transcoding the multimedia data is beneficial to meet different requirements of subsequent multimedia data display, thereby obtaining good display effect of the multimedia data.

In some embodiments, after publishing the synchronous multimedia data, the method may further include: displaying the synchronous multimedia data through a multimedia client corresponding to the second multimedia platform. The user-oriented application program of the second multimedia platform installed on the terminal device is the multimedia client. When the multimedia client obtains the user's display request for the synchronous multimedia data, the synchronous multimedia data may be obtained from the second multimedia platform and is displayed to the user, so that the user can perceive the ownership of the multimedia data while browsing the multimedia data.

Figure 3:
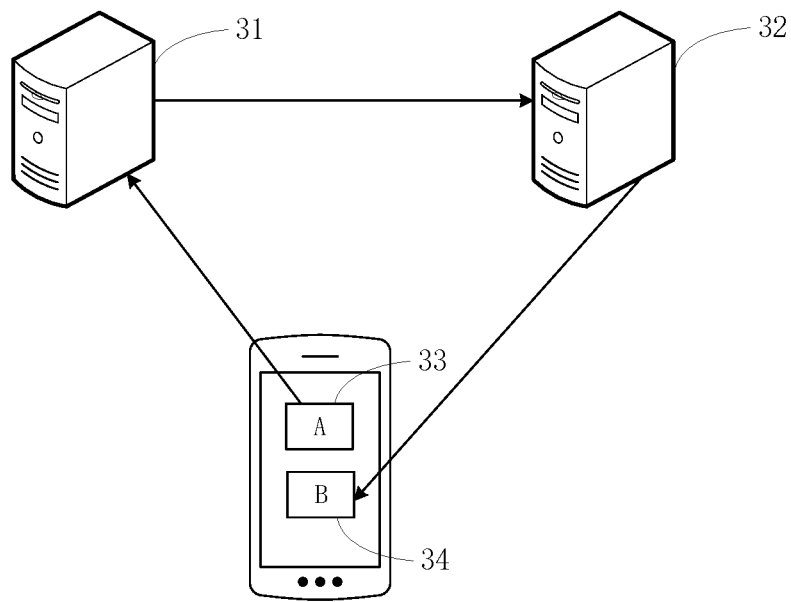
FIG. 3 is a schematic diagram of a process of publishing multimedia data according to an embodiment of the present disclosure.

On the basis of the foregoing embodiment, the method for publishing the multimedia data provided by the embodiment of the present disclosure is specifically described by using a specific example. Exemplarily, FIG. 3 is a schematic diagram of a process of publishing multimedia data according to an embodiment of the present disclosure. As shown in FIG. 3, a first multimedia client 33 may receive to-be-published multimedia data uploaded by a user and a multimedia synchronous publishing request submitted by the user, and send the to-be-published multimedia data and the multimedia synchronous publishing request to a first multimedia platform 31. The first multimedia platform 31 may publish the multimedia data, and send the multimedia synchronous publishing request to a second multimedia platform 32, where the multimedia synchronous publishing request is used to add the to-be-published multimedia data or synchronous multimedia data generated based on the to-be-published multimedia data. The second multimedia platform 32 receives the multimedia synchronous publishing request and publishes the synchronous multimedia data. When receiving a multimedia display request, the second multimedia client 33 may acquire the synchronous multimedia data in the second multimedia platform 32 and display the synchronous multimedia data to the user. The first multimedia platform 31 may send the multimedia data to the first multimedia client 33 to display the multimedia data to the user. The multimedia data published by the first multimedia platform 31 does not carry a watermark. The synchronous multimedia data published by the second multimedia platform 32 carries the identification information of the first multimedia platform, or synchronous multimedia data carries the identification information of the first multimedia platform and the identification information of the second multimedia platform.

The first multimedia platform 31 is called as an original platform, and the second multimedia platform 32 is called as a peer platform. The identification information is an identification watermark. The user first uploads multimedia data on the original platform, and completes relevant editing for publishing the multimedia data. The relevant editing may include, but not be limited to, setting a title, making a cover, and writing an introduction for the multimedia data or the like. If the user chooses to synchronize the multimedia data from the original platform to the peer platform, it is determined whether a valid account of the peer platform has been bound by the user. If the account is not bound, the account needs to be bound to complete the synchronization. The multimedia data is published on the original platform through the transcoding process in the original platform. The multimedia data may be viewed and consumed on the original platform after passing the review process. The multimedia data synchronized to the peer platform may be transcoded and added with an identification watermark of the original platform in the transcoding process at the peer platform. The user multimedia is combined with the identification watermark of the original platform in the way of service producing watermark pattern and sequence frame. The peer platform performs the transcoding process and adds the identification watermark of the original platform on the peer platform, and then publishes the multimedia data. The identification watermark of the original platform may be displayed when the client corresponding to the peer platform plays the multimedia data.

In the embodiment of the present disclosure, after the user completes the uploading, publishing and editing of the multimedia data, if the user chooses to publish the multimedia data to other multimedia platforms simultaneously, the multimedia data enters different transcoding processes. A watermark is not added in the transcoding process on the original platform, and the identification information of the original platform is added in the transcoding process on the peer platform. In this way, different display effects are realized, when the same multimedia data is played on different platforms, thereby protecting brand awareness of the original platform, and clarifying the ownership of the content. In addition, relevant information of multimedia creators is added to the identification information of the original platform, to enhance the cognition for the binding relationship between the multimedia creator and the platform.

In the method for publishing the multimedia data according to the embodiment of the present disclosure, an identifier of the original platform is added to the to-be-published multimedia data and the multimedia data is published in the peer platform. Therefore, a user of the peer platform can effectively perceive that the viewed content comes from the original platform, which enhances the positioning of content supply and content ownership of the original platform, and greatly increase the exposure and cognition of the original platform. In addition, with this method, the multimedia submission of the original platform does not influenced, and normal multimedia consumption experience of the original platform is ensured.

Figure 4:
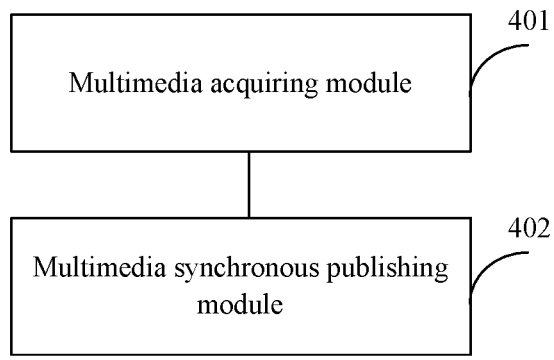
FIG. 4 is a schematic structural diagram of an apparatus for publishing multimedia data according to an embodiment of the present disclosure.

FIG. 4 is a schematic structural diagram of an apparatus for publishing multimedia data according to an embodiment of the present disclosure. The apparatus may be implemented by software and/or hardware, and may generally be integrated in an electronic device. As shown in FIG. 4, the apparatus is arranged in a first multimedia platform. The apparatus includes: a multimedia acquiring module 401 and a multimedia synchronous publishing module 402.

The multimedia acquiring module 401 is configured to acquire to-be-published multimedia data.

The multimedia synchronous publishing module 402 is configured to send, in response to an acquirement of a multimedia synchronous publishing request, the multimedia synchronous publishing request to a second multimedia platform indicated by the multimedia synchronous publishing request, where the multimedia synchronous publishing request is used to request the second multimedia platform to publish synchronous multimedia data generated based on the to-be-published multimedia data, where the synchronous multimedia data includes identification information of the first multimedia platform.

Optionally, the apparatus further includes a second platform identifying module configured to add identification information of the second multimedia platform to the to-be-published multimedia data, to generate the synchronous multimedia data; and send the synchronous multimedia data to the second multimedia platform.

Optionally, the apparatus further includes a first identification parameter module configured to generate the identification information of the first multimedia platform based on a first identification parameter of the first multimedia platform.

Optionally, the first identification parameter module is further configured to send the first identification parameter to the second multimedia platform, where the second multimedia platform generates the identification information of the first multimedia platform and adds the identification information of the first multimedia platform to the to-be-published multimedia data.

Optionally, the apparatus further includes a second identification parameter module configured to determine a second identification parameter of the second multimedia platform based on a pre-stored correspondence, and generate identification information of the second multimedia platform based on the second identification parameter, where the correspondence includes a correspondence between the second multimedia platform and the second identification parameter.

Optionally, the second identification parameter module is further configured to send the second identification parameter to the second multimedia platform, where the second identification parameter is used by the second multimedia platform to add the identification information of the second multimedia platform to the to-be-published multimedia data, and the identification information of the second multimedia platform is generated based on the second identification parameter.

Optionally, the identification information includes an identification watermark.

Optionally, an identification parameter corresponding to the identification information includes watermark content information and watermark style information.

Optionally, the watermark content information includes multimedia platform information; and the watermark style information includes at least one of watermark size information, watermark position information, and watermark shape information.

Optionally, the apparatus further includes a user identifier module configured to acquire a first user identifier of a user, acquire a second user identifier bound with the first user identifier, based on the first user identifier, and send the second user identifier to the second multimedia platform; or acquire a first user identifier of a user, and send the first user identifier to the second multimedia platform, where the second multimedia platform acquires a second user identifier bound with the first user identifier, and where the first user identifier is an identifier of the user on the first multimedia platform, and the second user identifier is an identifier of the user on the second multimedia platform.

Optionally, the apparatus further includes a first platform publishing module configured to publish, in response to the acquirement of the multimedia synchronous publishing request, multimedia data on the first multimedia platform.

Optionally, the apparatus further includes a first transcoding module configured to before the first multimedia platform publishes the multimedia data, transcode the to-be-published multimedia data based on a first preset transcoding rule, where the first preset transcoding rule includes at least one of special effect processing, format conversion and data compression.

The apparatus for publishing the multimedia data according to the embodiments of the present disclosure can perform the steps executed by the first multimedia platform in the method for publishing the multimedia data according to any embodiment of the present disclosure, which has corresponding functional modules for performing the method and has same beneficial effects as the method.

Figure 5:
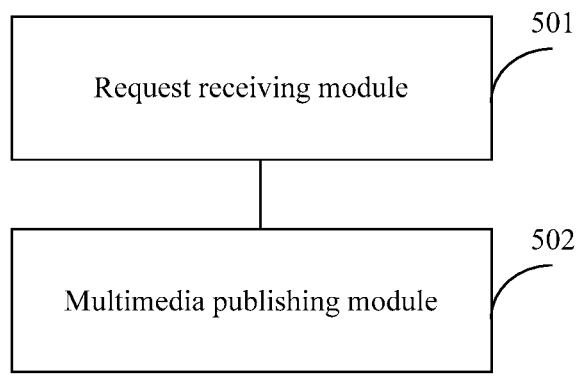
FIG. 5 is a schematic structural diagram of an apparatus for publishing multimedia data according to another embodiment of the present disclosure.

FIG. 5 is a schematic structural diagram of an apparatus for publishing multimedia data according to another embodiment of the present disclosure. The apparatus may be implemented by software and/or hardware, and may generally be integrated in an electronic device. As shown in FIG. 5, the apparatus is arranged in a second multimedia platform. The apparatus includes: a request receiving module 501 and a multimedia publishing module 502.

The request receiving module 501 is configured to receive a multimedia synchronous publishing request from a first multimedia platform, where the multimedia synchronous publishing request includes to-be-published multimedia data or synchronous multimedia data generated based on the to-be-published multimedia data.

The multimedia publishing module 502 is configured to publish the synchronous multimedia data, where the synchronous multimedia data includes identification information of the first multimedia platform.

Optionally, the multimedia synchronous publishing request includes the to-be-published multimedia data, and the apparatus further includes a first identifying module configured to identify the first multimedia platform; and add the identification information of the first multimedia platform to the to-be-published multimedia data, to generate the synchronous multimedia data.

Optionally, the multimedia data includes video data, and the first identifying module is further configured to add the identification information of the first multimedia platform to a first video frame set obtained by decoding the to-be-published multimedia data, to obtain a second video frame set; and encode the second video frame set to generate the synchronous multimedia data.

Optionally, the first identifying module is further configured to add the identification information of the first multimedia platform to a target video frame in the first video frame set, to obtain the second video frame set, where the target video frame is at least one video frame in the first video frame set.

Optionally, the apparatus further includes a first parameter module configured to acquire a first identification parameter sent by the first multimedia platform; or acquire a first identification parameter of the first multimedia platform which is stored locally.

Optionally, the first parameter module is further configured to generate the identification information of the first multimedia platform based on the first identification parameter; and add the identification information of the first multimedia platform to the to-be-published multimedia data, to generate the synchronous multimedia data.

Optionally, the apparatus further includes a second identifying module configured to before publishing the synchronous multimedia data, add identification information of the second multimedia platform to the to-be-published multimedia data.

Optionally, the apparatus further includes a second parameter module configured to acquire a second identification parameter of the second multimedia platform sent by the first multimedia platform, or acquire a second identification parameter which is stored locally; and generate the identification information of the second multimedia platform based on the second identification parameter.

Optionally, the apparatus further includes a user identity module configured to acquire from the first multimedia platform a second user identifier which is acquired based on a first user identifier of a user; or acquire a first user identifier of a user from the first multimedia platform and acquire a second user identifier bound with the first user identifier, based on the first user identifier, where the second user identifier is an identifier of the user on the second multimedia platform.

Optionally, the multimedia publishing module 502 is further configured to publish the synchronous multimedia data on the second multimedia platform.

Optionally, the apparatus further includes a second transcoding module configured to before publishing the synchronous multimedia data, transcode the synchronous multimedia data based on a second preset transcoding rule.

Optionally, the apparatus further includes a data display module configured to after publishing the synchronous multimedia data, display the synchronous multimedia data with a multimedia client corresponding to the second multimedia platform.

The apparatus for publishing the multimedia data according to the embodiments of the present disclosure can perform the steps executed by the second multimedia platform in the method for publishing the multimedia data according to any embodiment of the present disclosure, which has corresponding functional modules for performing the method and has same beneficial effects as the method.

Figure 6:
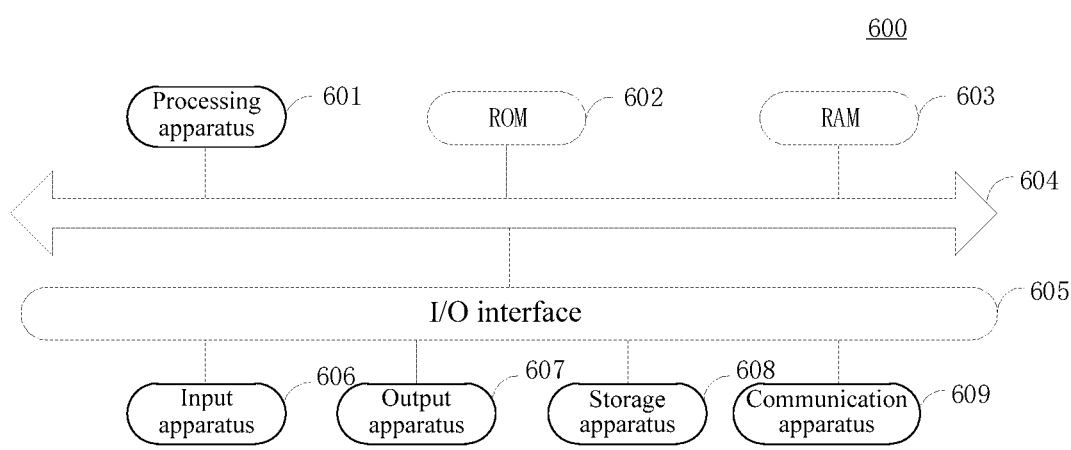
FIG. 6 is a schematic structural diagram of an electronic device according to an embodiment of the present disclosure.

FIG. 6 is a schematic structural diagram of an electronic device according to an embodiment of the present disclosure. Reference is made to FIG. 6 which shows a schematic structural diagram of an electronic device 600 for implementing the embodiments of the present disclosure. The terminal device 600 in the embodiments of the present disclosure may include, but not be limited to, mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 6 is schematic, and is not intended to limit functions and scope of the embodiments of the present disclosure.

As shown in FIG. 6, the electronic device 600 may include a processing apparatus (such as a central processor and a graphic processor) 601. The processing apparatus may perform various appropriate actions and processing by executing programs stored in a read-only memory (ROM) 602 or programs uploaded from a storage apparatus 608 to a random access memory (RAM) 603. Various programs and data required for operations of the electronic device 600 are also stored in the RAM 603. The processing apparatus 601, the ROM 602 and the RAM 603 are connected to each other through the bus 604. An input/output (I/O) interface 605 is also connected to the bus 604.

Generally, the following components are connected to the I/O interface 605: an input apparatus 606 such as a touch screen, a touch panel, a keyboard, a mouse, a camera, a microphone, an accelerometer, and gyroscope; an output apparatus 607 such as a liquid crystal display (LCD), a loudspeaker and a vibrator; a storage apparatus 608 such as a magnetic tape and a hard disk; and a communication apparatus 609. The communication apparatus 609 may allow the electronic device 600 to communicate with other device in a wired or wireless manner to exchange data. Although FIG. 6 shows the electronic device 600 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 609, installed from the storage apparatus 608 or installed from the ROM 602. The computer program is executed by the processing apparatus 601 to perform functions defined in the methods for publishing multimedia data described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. The one or more programs, when executed by the electronic device, cause the electronic device to: acquire to-be-published multimedia data; and send, in response to an acquirement of a multimedia synchronous publishing request, the multimedia synchronous publishing request to a second multimedia platform indicated by the multimedia synchronous publishing request, where the second multimedia platform publishes synchronous multimedia data generated based on the to-be-published multimedia data, where the synchronous multimedia data includes identification information of the first multimedia platform.

Alternatively, the computer readable medium carries one or more programs. The one or more programs, when executed by the electronic device, cause the electronic device to: receive a multimedia synchronous publishing request from a first multimedia platform, where the multimedia synchronous publishing request includes to-be-published multimedia data or synchronous multimedia data generated based on the to-be-published multimedia data; and publish the synchronous multimedia data, where the synchronous multimedia data includes identification information of the first multimedia platform.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case.

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a method for publishing multimedia data is provided. The method is applied to a first multimedia platform. The method includes:
    acquiring to-be-published multimedia data; and
    sending, in response to an acquirement of a multimedia synchronous publishing request, the multimedia synchronous publishing request to a second multimedia platform indicated by the multimedia synchronous publishing request, where the multimedia synchronous publishing request is used to request the second multimedia platform to publish synchronous multimedia data generated based on the to-be-published multimedia data, where the synchronous multimedia data includes identification information of the first multimedia platform.

According to one or more embodiments of the present disclosure, the method for publishing the multimedia data further includes:
    adding identification information of the second multimedia platform to the to-be-published multimedia data, and generating the synchronous multimedia data; and
    sending the synchronous multimedia data to the second multimedia platform.

According to one or more embodiments of the present disclosure, the method for publishing the multimedia data further includes:
    generating the identification information of the first multimedia platform based on a first identification parameter of the first multimedia platform.

According to one or more embodiments of the present disclosure, the method for publishing the multimedia data further includes:
    sending the first identification parameter to the second multimedia platform, where the first identification parameter is used by the second multimedia platform to generate the identification information of the first multimedia platform and add the identification information of the first multimedia platform to the to-be-published multimedia data.

According to one or more embodiments of the present disclosure, the method for publishing the multimedia data further includes:
    determining a second identification parameter of the second multimedia platform based on a pre-stored correspondence, and generating identification information of the second multimedia platform based on the second identification parameter, where the correspondence includes a correspondence between the second multimedia platform and the second identification parameter.

According to one or more embodiments of the present disclosure, the method for publishing the multimedia data further includes:
    sending the second identification parameter to the second multimedia platform, where the second identification parameter is used by the second multimedia platform to add to the to-be-published multimedia data the identification information of the second multimedia platform generated based on the second identification parameter.

According to one or more embodiments of the present disclosure, in the method for publishing the multimedia data, the identification information includes an identification watermark.

According to one or more embodiments of the present disclosure, in the method for publishing the multimedia data, an identification parameter corresponding to the identification information includes watermark content information and watermark style information.

According to one or more embodiments of the present disclosure, in the method for publishing the multimedia data, the watermark content information includes multimedia platform information, and the watermark style information includes at least one of watermark size information, watermark position information and watermark shape information.

According to one or more embodiments of the present disclosure, the method for publishing the multimedia data further includes:
    acquiring a first user identifier of a user, acquiring a second user identifier bound with the first user identifier based on the first user identifier, and sending the second user identifier to the second multimedia platform; or
    acquiring a first user identifier of a user, sending the first user identifier to the second multimedia platform, where the first user identifier is used by the second multimedia platform to acquire a second user identifier bound with the first user identifier;
    where the first user identifier is an identifier of the user on the first multimedia platform, and the second user identifier is an identifier of the user on the second multimedia platform.

According to one or more embodiments of the present disclosure, the method for publishing the multimedia data further includes:

publishing, in response to the acquirement of the multimedia synchronous publishing request, multimedia data on the first multimedia platform.

According to one or more embodiments of the present disclosure, before publishing the multimedia data on the first multimedia platform, the method for publishing the multimedia data further includes:

transcoding the to-be-published multimedia data based on a first preset transcoding rule, where the first preset transcoding rule includes at least one of special effect processing, format conversion and data compression.

According to one or more embodiments of the present disclosure, a method for publishing multimedia data is provided, and the method is applied to a second multimedia platform. The method includes:

receiving a multimedia synchronous publishing request from a first multimedia platform, where the multimedia synchronous publishing request includes to-be-published multimedia data or synchronous multimedia data generated based on the to-be-published multimedia data; and publishing the synchronous multimedia data, where the synchronous multimedia data includes identification information of the first multimedia platform.

According to one or more embodiments of the present disclosure, the multimedia synchronous publishing request includes the to-be-published multimedia data, the method for publishing the multimedia data further includes:

adding the identification information of the first multimedia platform to the to-be-published multimedia data, and generating the synchronous multimedia data.

According to one or more embodiments of the present disclosure, in the method for publishing the multimedia data, the multimedia data includes video data, the adding the identification information of the first multimedia platform to the to-be-published multimedia data to generate the synchronous multimedia data includes:

adding the identification information of the first multimedia platform to a first video frame set obtained by decoding the to-be-published multimedia data, to obtain a second video frame set; and encoding the second video frame set to generate the synchronous multimedia data.

According to one or more embodiments of the present disclosure, in the method for publishing the multimedia data, the adding the identification information of the first multimedia platform to a first video frame set obtained by decoding the to-be-published multimedia data to obtain a second video frame set includes:

adding the identification information of the first multimedia platform to a target video frame in the first video frame set, to obtain the second video frame set, where the target video frame is at least one video frame in the first video frame set.

According to one or more embodiments of the present disclosure, the method for publishing the multimedia data further includes:

acquiring a first identification parameter sent by the first multimedia platform, or acquiring a first identification parameter of the first multimedia platform which is stored locally.

According to one or more embodiments of the present disclosure, the method for publishing the multimedia data further includes:

generating the identification information of the first multimedia platform based on the first identification parameter; and adding the identification information of the first multimedia platform to the to-be-published multimedia data, and generating the synchronous multimedia data.

According to one or more embodiments of the present disclosure, in the method for publishing the multimedia data, the synchronous multimedia data further includes identification information of the second multimedia platform.

According to one or more embodiments of the present disclosure, the method for publishing the multimedia data further includes:

acquiring a second identification parameter of the second multimedia platform sent by the first multimedia platform or acquiring a second identification parameter which is stored locally; and generating the identification information of the second multimedia platform based on the second identification parameter.

According to one or more embodiments of the present disclosure, the method for publishing the multimedia data further includes:

acquiring, from the first multimedia platform, a second user identifier acquired based on a first user identifier of a user; or acquiring a first user identifier of a user from the first multimedia platform, and acquiring a second user identifier bound with the first user identifier, based on the first user identifier, where the first user identifier is an identifier of the user on the first multimedia platform, and the second user identifier is an identifier of the user on the second multimedia platform.

According to one or more embodiments of the present disclosure, in the method for publishing the multimedia data, the publishing the synchronous multimedia data includes:

publishing the synchronous multimedia data under the second user identifier.

According to one or more embodiments of the present disclosure, before publishing the synchronous multimedia data, the method for publishing the multimedia data further includes:

transcoding the synchronous multimedia data based on a second preset transcoding rule.

According to one or more embodiments of the present disclosure, after publishing the synchronous multimedia data, the method for publishing the multimedia data further includes:

displaying the synchronous multimedia data on a multimedia client corresponding to the second multimedia platform.

According to one or more embodiments of the present disclosure, an apparatus for publishing multimedia data is provided. The apparatus is arranged in a first multimedia platform. The apparatus includes:

a multimedia acquiring module configured to acquire to-be-published multimedia data; and a multimedia synchronous publishing module configured to send, in response to an acquirement of a multimedia synchronous publishing request, the multimedia synchronous publishing request to a second multimedia platform indicated by the multimedia synchronous publishing request, where the multimedia synchronous publishing request is used to request the second multimedia platform to publish synchronous multimedia data generated based on the to-be-published multimedia data, where the synchronous multimedia data includes identification information of the first multimedia platform.

According to one or more embodiments of the present disclosure, the apparatus for publishing the multimedia data further includes: a second platform identifying module configured to add identification information of the second multimedia platform to the to-be-published multimedia data, and generate the synchronous multimedia data; and send the synchronous multimedia data to the second multimedia platform.

According to one or more embodiments of the present disclosure, the apparatus for publishing the multimedia data further includes a first identification parameter module configured to generate the identification information of the first multimedia platform based on a first identification parameter of the first multimedia platform.

According to one or more embodiments of the present disclosure, the first identification parameter module is further configured to send the first identification parameter to the second multimedia platform, where the first identification parameter module is used for the second multimedia platform to generate the identification information of the first multimedia platform and add the identification information of the first multimedia platform to the to-be-published multimedia data.

According to one or more embodiments of the present disclosure, the apparatus further includes a second identification parameter module configured to determine a second identification parameter of the second multimedia platform based on a pre-stored correspondence, and generate identification information of the second multimedia platform based on the second identification parameter, where the correspondence includes a correspondence between the second multimedia platform and the second identification parameter.

According to one or more embodiments of the present disclosure, the second identification parameter module is further configured to send the second identification parameter to the second multimedia platform, where the second identification parameter is used by the second multimedia platform to add to the to-be-published multimedia data the identification information of the second multimedia platform generated based on the second identification parameter.

According to one or more embodiments of the present disclosure, in the apparatus for publishing the multimedia data, the identification information includes an identification watermark According to one or more embodiments of the present disclosure, in the apparatus for publishing the multimedia data, an identification parameter corresponding to the identification information includes watermark content information and watermark style information.

According to one or more embodiments of the present disclosure, in the apparatus for publishing the multimedia data, the watermark content information includes multimedia platform information, and the watermark style information includes at least one of watermark size information, watermark position information and watermark shape information.

According to one or more embodiments of the present disclosure, the apparatus for publishing the multimedia data further includes a user identifier module configured to acquire a first user identifier of a user, and acquire a second user identifier bound with the first user identifier, based on the first user identifier, and send the second user identifier to the second multimedia platform; or acquire a first user identifier of a user, send the first user identifier to the second multimedia platform, where the first user identifier is used for the second multimedia platform to acquire a second user identifier bound with the first user identifier; where the first user identifier is an identifier of the user on the first multimedia platform, and the second user identifier is an identifier of the user on the second multimedia platform.

According to one or more embodiments of the present disclosure, the apparatus for publishing the multimedia data further includes a first platform publishing module configured to publish, in response to the acquirement of the multimedia synchronous publishing request, multimedia data on the first multimedia platform.

According to one or more embodiments of the present disclosure, the apparatus further includes a first transcoding module configured to before the first multimedia platform publishes the multimedia data, transcode the to-be-published multimedia data based on a first preset transcoding rule, where the first preset transcoding rule includes at least one of special effect processing, format conversion and data compression.

According to one or more embodiments of the present disclosure, an apparatus for publishing multimedia data is provided. The apparatus is arranged in a second multimedia platform. The apparatus includes:
  a request receiving module configured to receive a multimedia synchronous publishing request from a first multimedia platform, where the multimedia synchronous publishing request includes to-be-published multimedia data or synchronous multimedia data generated based on the to-be-published multimedia data; and
  a multimedia publishing module configured to publish the synchronous multimedia data, where the synchronous multimedia data includes identification information of the first multimedia platform.

According to one or more embodiments of the present disclosure, the multimedia synchronous publishing request includes the to-be-published multimedia data, and the apparatus for publishing the multimedia data further includes a first identifying module configured to add the identification information of the first multimedia platform to the to-be-published multimedia data, and generate the synchronous multimedia data.

According to one or more embodiments of the present disclosure, in the apparatus for publishing the multimedia data, the multimedia data includes video data, the first identifying module is further configured to add the identification information of the first multimedia platform to a first video frame set obtained by decoding the to-be-published multimedia data, to obtain a second video frame set; and encode the second video frame set to generate the synchronous multimedia data.

According to one or more embodiments of the present disclosure, in the apparatus for publishing the multimedia data, the first identifying module is further configured to add the identification information of the first multimedia platform to a target video frame in the first video frame set, to obtain the second video frame set, where the target video frame is at least one video frame in the first video frame set.

According to one or more embodiments of the present disclosure, the apparatus for publishing the multimedia data further includes a first parameter module configured to acquire a first identification parameter sent by the first multimedia platform, or acquire a first identification parameter of the first multimedia platform which is stored locally.

According to one or more embodiments of the present disclosure, in the apparatus for publishing the multimedia data, the first parameter module is further configured to: generate the identification information of the first multimedia platform based on the first identification parameter; and add the identification information of the first multimedia platform to the to-be-published multimedia data, and generate the synchronous multimedia data.

According to one or more embodiments of the present disclosure, in the apparatus for publishing the multimedia data, the synchronous multimedia data further includes identification information of the second multimedia platform.

According to one or more embodiments of the present disclosure, the apparatus for publishing the multimedia data further includes a second parameter module configured to acquire a second identification parameter of the second multimedia platform sent by the first multimedia platform, or acquire a second identification parameter which is stored locally; and generate the identification information of the second multimedia platform based on the second identification parameter.

According to one or more embodiments of the present disclosure, the apparatus for publishing the multimedia data further includes a user identity module configured to acquire, from the first multimedia platform, a second user identifier acquired based on a first user identifier of a user; or acquire a first user identifier of a user from the first multimedia platform and acquire a second user identifier bound with the first user identifier, based on the first user identifier, where the first user identifier is an identifier of the user on the first multimedia platform and the second user identifier is an identifier of the user on the second multimedia platform.

According to one or more embodiments of the present disclosure, in the apparatus for publishing the multimedia data, the multimedia publishing module is further configured to publish the synchronous multimedia data under the second user identifier.

According to one or more embodiments of the present disclosure, the apparatus for publishing the multimedia data further includes a second transcoding module configured to before the synchronous multimedia data is published, transcode the synchronous multimedia data based on a second preset transcoding rule.

According to one or more embodiments of the present disclosure, the apparatus for publishing the multimedia data further includes a data display module configured to after the synchronous multimedia data is published, display the synchronous multimedia data on a multimedia client corresponding to the second multimedia platform.

According to one or more embodiments of the present disclosure, an electronic device is provided. The electronic device includes a processor; and a memory for storing instructions executable by the processor. The processor is configured to read the executable instructions from the memory, and execute the instructions to implement the method for publishing the multimedia data according to embodiments of the disclosure.

According to one or more embodiments of the present disclosure, a computer-readable storage medium is provided. The storage medium stores a computer program. The computer program is used to implement the method for publishing the multimedia data according to embodiments of the disclosure.

The preferred embodiments and the technical principles of the present disclosure are described above. It should be understood by those skilled in the art that the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A method for publishing multimedia data, wherein the method is applied to a first multimedia platform, and the method comprises:
    acquiring to-be-published multimedia data; and
    sending, in response to an acquirement of a multimedia synchronous publishing request, the multimedia synchronous publishing request to a second multimedia platform indicated by the multimedia synchronous publishing request, wherein the multimedia synchronous publishing request is used to request the second multimedia platform to publish synchronous multimedia data generated based on the to-be-published multimedia data, wherein the synchronous multimedia data comprises identification information of the first multimedia platform and identification information of the second multimedia platform, wherein the identification information of the first multimedia platform is used to characterize the first multimedia platform, and the identification information of the second multimedia platform is used to characterize the second multimedia platform.

2. The method according to claim 1, further comprising:
    Adding the identification information of the second multimedia platform to the to-be-published multimedia data, and generating the synchronous multimedia data; and
    sending the synchronous multimedia data to the second multimedia platform.

3. The method according to claim 1, further comprising:
    generating the identification information of the first multimedia platform based on a first identification parameter of the first multimedia platform.

4. The method according to claim 1, further comprising:
    determining a second identification parameter of the second multimedia platform based on a pre-stored correspondence, and generating the identification information of the second multimedia platform based on the second identification parameter, wherein the correspondence comprises a correspondence between the second multimedia platform and the second identification parameter.

5. The method according to claim 1, wherein the identification information comprises an identification watermark.

6. The method according to claim 5, wherein an identification parameter corresponding to the identification information comprises watermark content information and watermark style information.

7. The method according to claim 6, wherein the watermark content information comprises multimedia platform information, and the watermark style information comprises at least one of watermark size information, watermark position information and watermark shape information.

8. The method according to claim 1, further comprising:
acquiring a first user identifier of a user; acquiring a second user identifier bound with the first user identifier, based on the first user identifier; and sending the second user identifier to the second multimedia platform; or
acquiring a first user identifier of a user, sending the first user identifier to the second multimedia platform, wherein the first user identifier is used by the second multimedia platform to acquire a second user identifier bound with the first user identifier;
wherein the first user identifier is an identifier of the user on the first multimedia platform, and the second user identifier is an identifier of the user on the second multimedia platform.

9. The method according to claim 1, further comprising:
transcoding the to-be-published multimedia data based on a first preset transcoding rule, wherein the first preset transcoding rule comprises at least one of special effect processing, format conversion and data compression; and
publishing, in response to the acquirement of the multimedia synchronous publishing request, multimedia data on the first multimedia platform.

10. The method according to claim 9, wherein before publishing the multimedia data on the first multimedia platform, the method further comprises:
transcoding the to-be-published multimedia data based on a first preset transcoding rule, wherein the first preset transcoding rule comprises at least one of special effect processing, format conversion and data compression.

11. A method for publishing multimedia data, wherein the method is applied to a second multimedia platform, and the method comprises:
receiving a multimedia synchronous publishing request from a first multimedia platform, wherein the multimedia synchronous publishing request comprises to-be-published multimedia data or synchronous multimedia data generated based on the to-be-published multimedia data; and
publishing the synchronous multimedia data, wherein the synchronous multimedia data comprises identification information of the first multimedia platform and identification information of the second multimedia platform, wherein the identification information of the first multimedia platform is used to characterize the first multimedia platform, and the identification information of the second multimedia platform is used to characterize the second multimedia platform.

12. The method according to claim 11, wherein the multimedia synchronous publishing request comprises the to-be-published multimedia data, the method further comprises:
adding the identification information of the first multimedia platform to the to-be-published multimedia data, and generating the synchronous multimedia data.

13. The method according to claim 12, wherein the multimedia data comprises video data, the adding the identification information of the first multimedia platform to the to-be-published multimedia data, and generating the synchronous multimedia data comprises:
adding the identification information of the first multimedia platform to a first video frame set obtained by decoding the to-be-published multimedia data, to obtain a second video frame set; and
encoding the second video frame set to generate the synchronous multimedia data.

14. The method according to claim 13, wherein the adding the identification information of the first multimedia platform to a first video frame set obtained by decoding the to-be-published multimedia data to obtain a second video frame set comprises:
adding the identification information of the first multimedia platform to a target video frame in the first video frame set, to obtain the second video frame set, wherein the target video frame is at least one video frame in the first video frame set.

15. The method according to claim 11, further comprising:
acquiring a first identification parameter sent by the first multimedia platform, or acquiring a first identification parameter of the first multimedia platform which is stored locally.

16. The method according to claim 15, further comprising:
generating the identification information of the first multimedia platform based on the first identification parameter; and
adding the identification information of the first multimedia platform to the to-be-published multimedia data, and generating the synchronous multimedia data.

17. The method according to claim 11, wherein the synchronous multimedia data further comprises identification information of the second multimedia platform.

18. The method according to claim 17, further comprising:
acquiring a second identification parameter of the second multimedia platform sent by the first multimedia platform, or acquiring a second identification parameter which is stored locally; and
generating the identification information of the second multimedia platform based on the second identification parameter.

19. The method according to claim 11, further comprising:
acquiring, from the first multimedia platform, a second user identifier acquired based on a first user identifier of a user; or
acquiring a first user identifier of a user from the first multimedia platform; and acquiring a second user identifier bound with the first user identifier, based on the first user identifier,
wherein the first user identifier is an identifier of the user on the first multimedia platform, and the second user identifier is an identifier of the user on the second multimedia platform.

20. The method according to claim 19, wherein the publishing the synchronous multimedia data comprises:
publishing the synchronous multimedia data under the second user identifier.

21. The method according to claim 11, wherein before publishing the synchronous multimedia data, the method further comprises:
transcoding the synchronous multimedia data based on a second preset transcoding rule.

22. The method according to claim 11, wherein after publishing the synchronous multimedia data, the method further comprises:
displaying the synchronous multimedia data, on a multimedia client corresponding to the second multimedia platform.

23. An apparatus for publishing multimedia data, the apparatus being arranged in a first multimedia platform, wherein the apparatus comprises:
a processor; and
a memory for storing executable instructions,
wherein the processor is configured to read the executable instructions from the memory, and execute the instructions to
acquire to-be-published multimedia data; and
send, in response to an acquirement of a multimedia synchronous publishing request, the multimedia synchronous publishing request to a second multimedia platform indicated by the multimedia synchronous publishing request, wherein the multimedia synchronous publishing request is used to request the second multimedia platform to publish synchronous multimedia data generated based on the to-be-published multimedia data, wherein the synchronous multimedia data comprises identification information of the first multimedia platform and identification information of the second multimedia platform, wherein the identification information of the first multimedia platform is used to characterize the first multimedia platform, and the identification information of the second multimedia platform is used to characterize the second multimedia platform, or
wherein the processor is configured to read the executable instructions from the memory, and execute the instructions to
receive a multimedia synchronous publishing request from a first multimedia platform, wherein the multimedia synchronous publishing request comprises to-be-published multimedia data or synchronous multimedia data generated based on the to-be-published multimedia data; and
publish the synchronous multimedia data, wherein the synchronous multimedia data comprises identification information of the first multimedia platform and identification information of the second multimedia platform, wherein the identification information of the first multimedia platform is used to characterize the first multimedia platform, and the identification information of the second multimedia platform is used to characterize the second multimedia platform.

24. A non-transitory computer readable medium storing executable instructions, wherein the executable instructions, when executed by a processor, cause the processor to:
acquire to-be-published multimedia data; and
send, in response to an acquirement of a multimedia synchronous publishing request, the multimedia synchronous publishing request to a second multimedia platform indicated by the multimedia synchronous publishing request, wherein the multimedia synchronous publishing request is used to request the second multimedia platform to publish synchronous multimedia data generated based on the to-be-published multimedia data, wherein the synchronous multimedia data comprises identification information of the first multimedia platform and identification information of the second multimedia platform, wherein the identification information of the first multimedia platform is used to characterize the first multimedia platform, and the identification information of the second multimedia platform is used to characterize the second multimedia platform, or
wherein the executable instructions, when executed by a processor, cause the processor to:
receive a multimedia synchronous publishing request from a first multimedia platform, wherein the multimedia synchronous publishing request comprises to-be-published multimedia data or synchronous multimedia data generated based on the to-be-published multimedia data; and
publish the synchronous multimedia data, wherein the synchronous multimedia data comprises identification information of the first multimedia platform and identification information of the second multimedia platform, wherein the identification information of the first multimedia platform is used to characterize the first multimedia platform, and the identification information of the second multimedia platform is used to characterize the second multimedia platform.

* * * * *